United States Patent

Yasuda et al.

[15] 3,638,523

[45] Feb. 1, 1972

[54] SHEARING MACHINE OF THE INTERCHANGEABLE KNIFE-HOLDER-TYPE

[72] Inventors: Tetutaro Yasuda; Tsuneo Nakanishi, both of Hitachi, Japan

[73] Assignee: Hitachi, Ltd., Tokyo, Japan

[22] Filed: May 13, 1970

[21] Appl. No.: 36,757

[30] Foreign Application Priority Data

May 14, 1969 Japan.................................44/36561

[52] U.S. Cl......................................83/700, 83/563, 83/698
[51] Int. Cl...............................................B26d 7/26
[58] Field of Search .............................83/563, 698, 699, 700

[56] References Cited

UNITED STATES PATENTS 3,077,134  2/1963  Ronick................................83/700 X
3,413,882  12/1968  Richmond et al....................83/700 X
3,460,423  8/1969  Hayashi .............................83/563 X

*Primary Examiner*—James M. Meister
*Attorney*—Craig, Antonelli, Stewart & Hill

[57] ABSTRACT

A shearing machine of the interchangeable knife-holder-type in which the knife holders are able to be laterally removed together with the movable and stationary knifes supported thereon out of the machine. The movable and stationary knife holders are provided with adjusting wedges respectively so that each wedge disposed in the knife holder may independently adjust the clearance at the knife holder slide guide and the clearance between the movable and stationary knives. Thus is obviated the adjusting operation of the above-described clearances after the knife holders are mounted to the machine.

4 Claims, 6 Drawing Figures

INVENTOR
TETUTARO YASUDA
TSUNEO NAKANISHI

BY Craig, Antonelli, Stewart & Hill

ATTORNEYS

SHEARING MACHINE OF THE INTERCHANGEABLE KNIFE-HOLDER-TYPE

The present invention relates to a shearing machine for cutting metal sheets produced by a rolling mill and other materials, and more particularly to a vertical shearing machine of the interchangeable knife holder type in which the knife holders are to be able to be laterally removed together with the knives supported thereby out of the machine.

Generally, the knives in the shearing machine are changed each time different materials are to be cut in accordance with the configuration and type of the materials to be cut. Such changes and the necessary realignment of the knives are extremely time consuming and cause the machine to remain idle while these steps are carried out, which results in a very considerable loss in production. In the shearing machine field, accordingly, a reduction in the time required for such changes of knives has been desired. Particularly in the case of a shearing machine used in cooperation with the strip-rolling equipment and the like where the knives should be frequently changed, the reduction in the time required for such changes of knives has been earnestly desired.

However, in view of the fact that the knives of the conventional ordinary shearing machine of this type have been changed by unscrewing the knife-clamping bolts each time the knives are to be changed, there is a limit in reduction in the time required for such changes of knives. Particularly, in the case of a shearing machine adapted to be used for cutting materials of high temperature, it takes a long time to change the knives since the operator should wait until the knives are cooled down to the temperature at which the knife changing operation is able to be performed with safety. Furthermore, because of the fact that the weight of the knives and knife-clamping bolts is large and there is little space as well as footing for the operation in and below the shearing machine, the knife-changing operation in the conventional shearing machine has been dangerous and had low operation efficiency.

Under the above-described disposition of the conventional type of the shearing machine, it has been proposed to provide a shearing machine of the interchangeable knife holder type in which the knife holders are able to be laterally removed out of the machine together with the knives supported thereon so that the knives may be replaced outside the machine such as is disclosed in the U.S. Pat. Nos. 3,077,134 and 3,460,423.

It should be noted, however, that the conventional shearing machine of the interchangeable knife holder type has various disadvantages as follows, as is disclosed in the above United States patents. Since the movable and stationary knife holders are mounted in a carriage mounted separately and independently of other members in the housing so that the movable and stationary knife holders are changed together with said carriage as a unit when the knives are changed, the knife holder unit to be changed has a complicated construction. Particularly in the case of a shearing machine adapted to handle hot slabs in which the shearing load exceeds 2,000 tons, an increase in the size of the knife holder unit results in an increase in the size and price of the shearing machine. Moreover, such structure has sliding surfaces formed between the movable and stationary knife holders and the carriage and between the carriage and the housing. The multiplicity of sliding surfaces in the machine of this type is not desirable. When the temperature of the knife holders rises to 150° or 250° C., misalignment of parts and an error in operation may occur due to thermal expansion or degradation of the quality of the grease. The shearing operation may be interfered with by cooling water or scale finding its way into the sliding surfaces. Increased permanent strain may be caused in the sliding surfaces by an impact load applied thereto when the cutting operation is performed, thereby making maintenance and inspection of the machine more troublesome than otherwise.

In order to overcome the above-described defects of the conventional type of the shearing machine, the applicant of the present application for patent has recently proposed a novel shearing machine of the interchangeable knife holder type (U.S. Ser. No. 857,422). In the above-mentioned novel shearing machine of the interchangeable knife holder type, the movable and stationary knife holders are not mounted in the carriage as described above but directly inserted in an opening in the housing. The inner sides of the housing defining the opening serve as guide surfaces for the knife holder when the holder is mounted in or removed from the machine and also as sliding surfaces along which the movable knife holder moves in sliding motion when a shearing operation is performed. The novel shearing machine overcomes the defects of the conventional shearing machine as described above.

On the other hand, however, the shearing machine of the interchangeable knife holder type as described above has such a disadvantage as that the adjusting operation of the clearance between the knife holder and the sliding surface and between the movable and stationary knives is difficult to perform.

The adjusting operation of the clearance is explained as follows. Generally in this type of the shearing machine in which the knife holders are able to be interchanged, a predetermined clearance is required to be provided between the inner sides of the opening of the housing and the knife holder or the carriage for the knife holder in order that the knife holder may be easily changed and the knife holder may be smoothly slid up and down along the sides of the opening even when the temperature of the knife holder rises up to effect thermal expansion. And also between the movable and stationary knives there should be a clearance so that the movable and stationary knives may not interfere with each other and the materials to be cut may be effectively cut thereby. Such clearances required are to be adjusted each time the knife holders are interchanged on account of the variation in shape of the knives effected by the knife repairing and the abrasion of the sliding surfaces of the housing. In the case of the conventional shearing machine of the housing of the interchangeable knife holder type, the clearance adjusting operation in the housing can be eliminated only by adjusting the clearance between the movable and stationary knives mounted in the carriage in advance outside the machine if the carriage is made of material having sufficient rigidity. In the newly developed shearing machine of the interchangeable knife holder type as described above, however, the clearance adjusting operation outside the machine is not able to effect a right adjustment of clearance in the machine when the knife holders are mounted in the machine since only the movable and stationary knives themselves are separately changed.

The present invention is made in view of the above-described defects and disadvantages of the conventional shearing machine, and accordingly it is a primary object of the present invention to eliminate the adjusting operation of the clearance between the sliding surfaces and the knife holders and between the movable and stationary knives after the movable and stationary knife holders are mounted in the housing and thereby shortening greatly the time required for changing the knives in the shearing machine of the interchangeable knife holder type in which only the movable and stationary knives themselves are separately changed.

The shearing machine in accordance with the present invention has a combination of a couple of constructions as follows in order to accomplish the above object:

1. providing adjustable wedge means in the movable and stationary knife holders.
2. providing hydraulic pressure cylinder means for fixedly holding a stationary knife holder by urging the holder onto one side of the opening at an end thereof.

In summary, in accordance with the present invention there is provided a shearing machine in which the improvement comprises a first adjustable wedge means mounted in a movable knife holder for making a predetermined clearance between the movable knife holder and the sliding surface of the opening of the housing before the movable knife holder is inserted in the opening of the housing, a second adjustable wedge means mounted in a stationary knife holder for making a predetermined clearance between the movable and stationary knives, and hydraulic pressure cylinder means disposed in the housing for fixedly holding the stationary knife holder by urging the holder onto one side of the opening of the housing in the direction to enlarge the clearance between the movable and stationary knives.

The invention and its objects and advantages may be better understood from the following detailed description of one embodiment wherein reference is made to the accompanying drawings in which.

Figure 1:
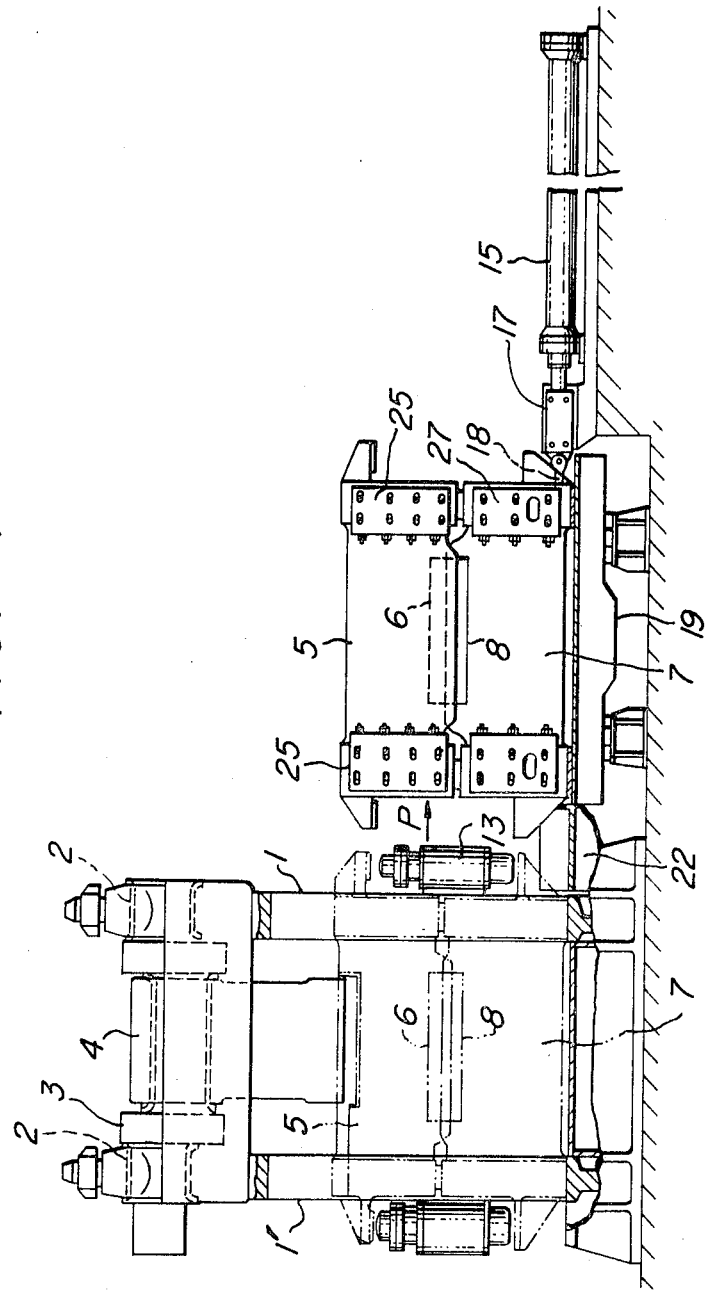
FIG. 1 is an elevational front view partly in section of the shearing machine of the interchangeable knife holder type in accordance with the present invention when the knife holders are interchanged.

The drawings illustrate a vertical shearing machine in which sheetlike materials are cut by the downward movement of the movable upper knife supported by a knife holder caused by an electrically operated crank. A crankshaft 3 is rotatably mounted by bearings 2 on the upper portion of the housing 1, 1'. An upper movable knife holder 5 and an upper movable knife 6 supported thereon are moved up and down by the rotation of the crankshaft 3 through a connecting rod 4 attached to the crankshaft. As the upper knife holder 5 descends, the upper knife 6 and a lower stationary knife 8 supported on a lower stationary knife holder 7 firmly fixed to the housing 1, 1' cut a material therebetween. The upper and lower knife holders 5 and 7 are not mounted in a carriage as in the conventional shearing machine, but directly inserted into the opening 9 in the housing 1, 1'. The upper and lower knives 6 and 8 are secured to the upper and lower knife holders 5 and 7 with bolts 10, 11. The upper knife holder 5 is connected with the connecting rod 4 at the lower end of the latter received in a semicylindrical bearing 12 providing at the top of the former. The upper knife holder 5 is removed from the connecting rod 4 by a couple of oil pressure cylinders 13 and 14 which have upwardly pushing force overcoming the weight of the upper knife holder 5 and the connecting rod 4 and are located between the upper and lower knife holder 5 and 7. The arrangement, construction and function of the oil pressure cylinders 13 and 14 do not have significant relation with the present invention, and the description thereof is accordingly omitted.

Figure 3:
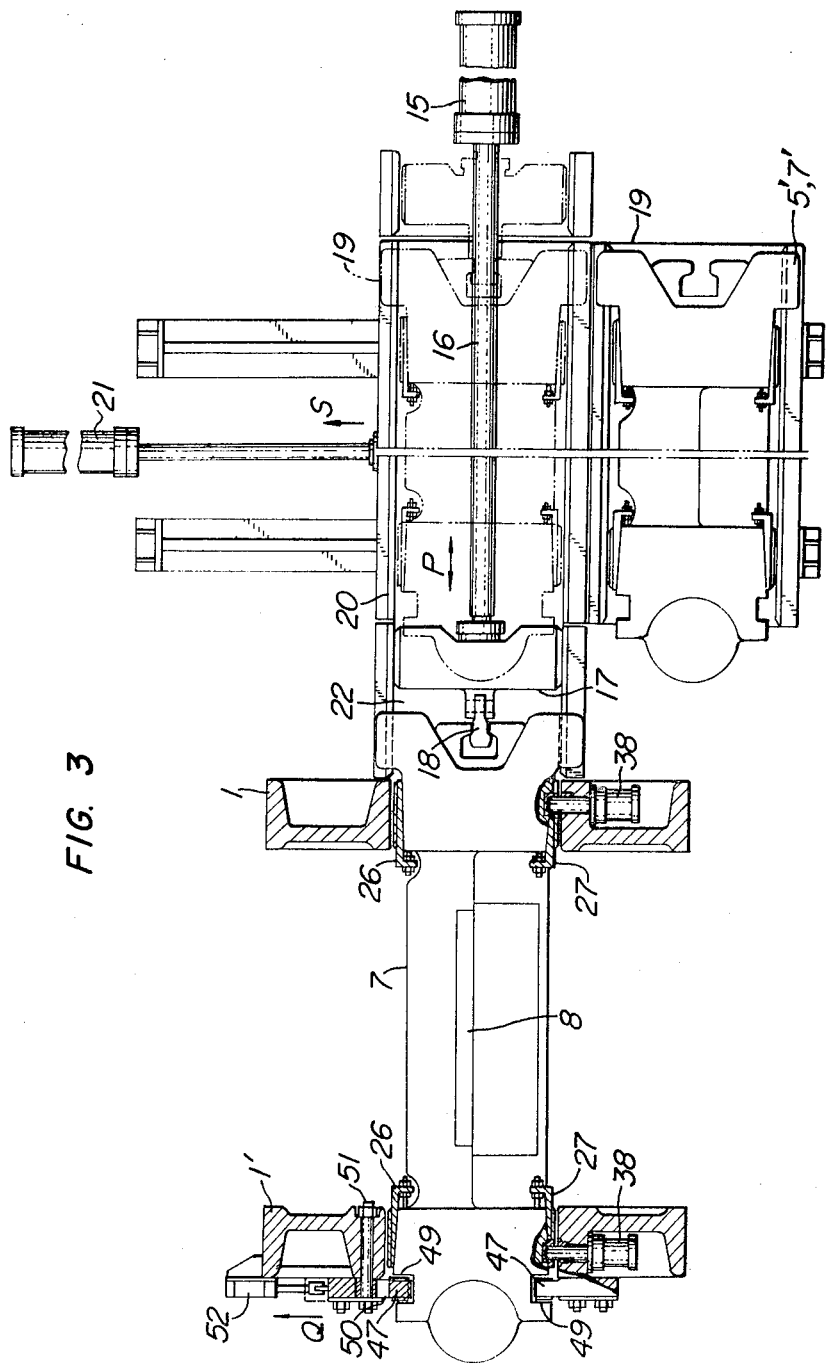
FIG. 3 is a sectional plan view taken along the line III—III in FIG. 2.

As shown in FIGS. 1 and 3, the knife holders 5 and 7 are removed together from the machine in the direction normal to the path of the movement of the materials to be cut. The upper and lower knife holders 5 and 7 are slided on the intermediate support base 22 and the support base 19 by the pulling operation of the cylinder 15 for interchanging. The direction in which the upper and lower knife holders 5 and 7 are drawn out is indicated by an arrow P. The piston rod 16 of the oil pressure cylinder 15 for interchanging the knife holders is made connectable with the lower knife holder 7 through a guide sled 17 and a coupling rod 18. The guide sled 17 is slided horizontally from end to end on the support base 19 guided by the guide surfaces 20 extending longitudinally on the both sides of the support base. As apparent from the drawing particularly in FIG. 3, the above-described mechanism for interchanging the knife holders is of the double sled type, in which preliminary knife holders 5' and 7' are placed beside the support base 19 so that the preliminary knife holders 5' and 7' may be laterally brought into the position to be engaged with the guide sled 17 by the lateral movement of the support base 19 in the direction S normal to the direction P. FIG. 1 shows the state of the machine where the upper and lower knife holders are drawn out of or are going to be inserted into the housing of the machine. FIG. 3 shows the state of the machine where the upper and lower knife holders are going to be drawn out of the housing. After the upper and lower knife holders 5 and 7 are drawn out of the housing by the cylinder 15 and the guide sled 17, the coupling rod 18 is removed from the lower knife holder 7 so that the upper and lower knife holders may be shifted sideward. After the upper and lower knife holder 5 and 7 are removed from the coupling rod 18 and guide sled 17 on the support base 19, the holders 5 and 7 are shifted laterally in the direction S by the cylinder 21 for sideward shifting together with the preliminary upper and lower holders 5' and 7'. Thus, the preliminary upper and lower knife holders 5' and 7' are brought into the position aligned with the housing of the machine. Then the lower knife holder 7' brought into the position to be inserted into the housing is connected with the coupling rod 18 of the guide sled 17 fixed at the end of the piston rod 16 of the cylinder 15. By operating the cylinder, the upper and lower knife holders 5' and 7' are inserted into the housing 1 and 1' of the machine to complete the interchanging operation.

Figure 5:
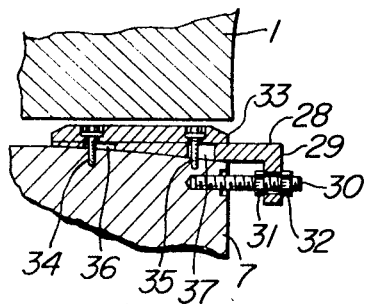
FIG. 5 is a detailed enlarged sectional view of the adjustable wedge means employed in the present invention.

The manner in which the upper and lower knife holders are adjusted by the adjusting-wedge means 25, 26 and 27 will now be explained. The adjusting wedge 25 is mounted on one side surface of the upper knife holder 5 to adjust the clearance $\delta_1$ between the upper knife holder 5 and the sliding surface of the opening 9 of the housing 1. The adjusting wedge 26 is mounted on one side surface of the lower knife holder 7 to adjust the clearance $C_0$ between the upper knife 6 and the lower knife 8. The adjusting wedge 27 is mounted on the other side surface of the lower knife holder 7 to adjust the clearance $\delta_2$ between the lower knife holder 7 and the sliding surface of the opening 9 of the housing 1. The clearance $\delta_2$, however, is only required for the insertion of the knife holders into the housing and, accordingly, is not necessarily required to be adjusted. In view of the above fact, the above adjusting wedge 27 can be substituted for by a stationary liner. Since the adjusting wedge means 25, 26 and 27 have the same construction and function as apparent from the above description and drawing, the detailed description thereof will be made only with reference to the adjusting wedge 26 referring to FIG. 5 as an example. The wedge member 28 is mounted to the lower knife holder 7 with an adjusting bolt 30 fitted to a lug 29 integrally and laterally extending at the end of the wedge member 28. The bolt 30 is fitted to the lug 29 with a couple of nuts 31 and 32 so that the position of the wedge member 28 may be adjusted by the adjustment of the nuts 31 and 32. The wedge member 28 is tapered and is supported and guided by a bracket 33 so that the wedge member 28 may be slided along the slope formed on the end surface of the lower knife holder 7. The bracket 33 is secured to the slope surface of the lower knife holder 7 with a couple of screws 34 and 35 extending through a couple of slots 36 and 27 provided on the wedge member 28 respectively. In operation, the screws 34 and 35 are slightly unscrewed to let the wedge member 28 slide further inwardly along the slope of the lower knife holder 7. The wedge member 28 is slided along the slope by adjusting the adjusting nuts 31 and 32. Thus, the clearance between the surface of the housing 1 and the surface of the bracket 33 is adjusted at will. The above-described adjusting operation of the clearance is performed outside the machine, and the manner in which the three wedges are adjusted in relation with one another will be described hereinafter.

Figure 2:
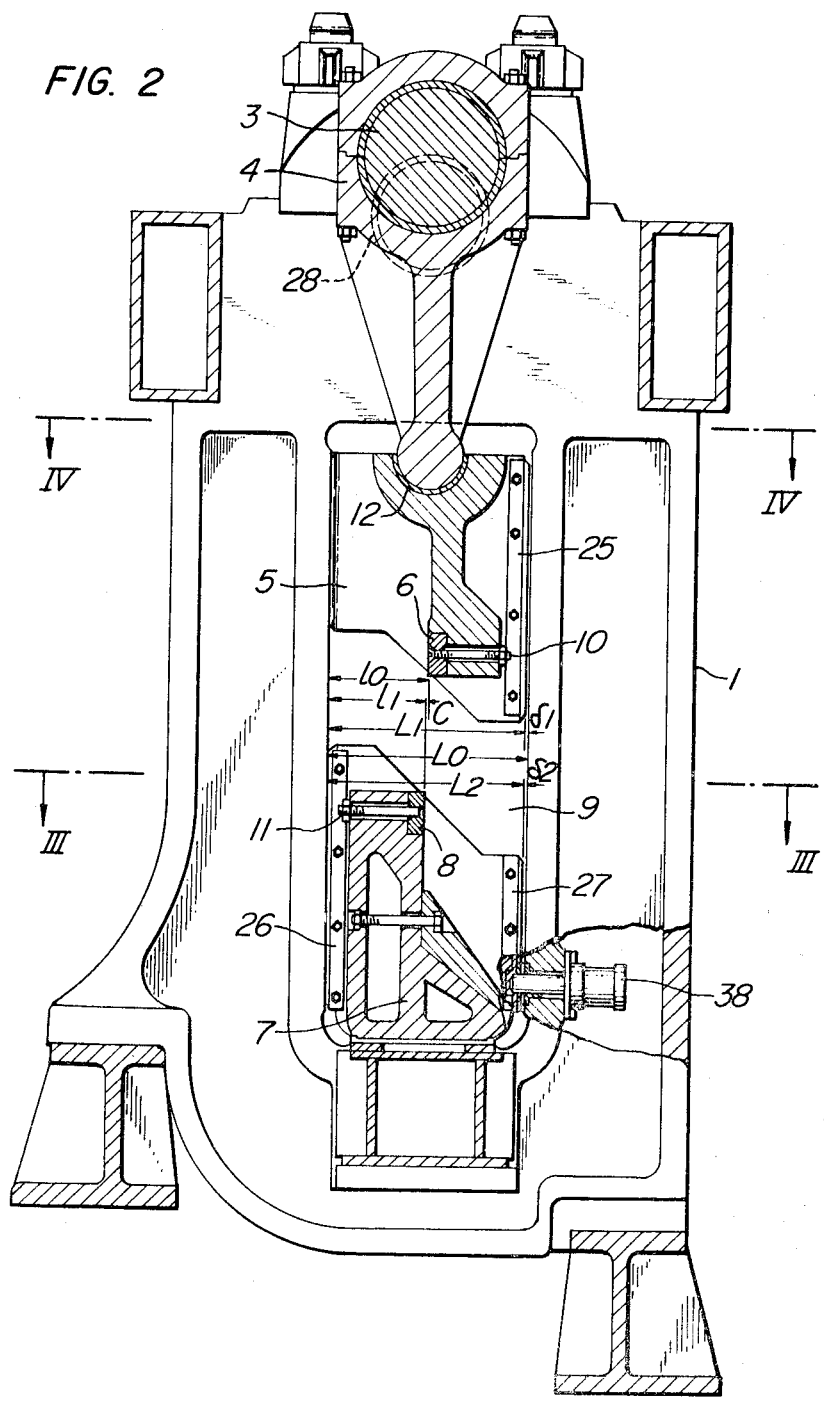
FIG. 2 is an enlarged vertical sectional side view of the shearing machine as shown in FIG. 1.
Figure 6:
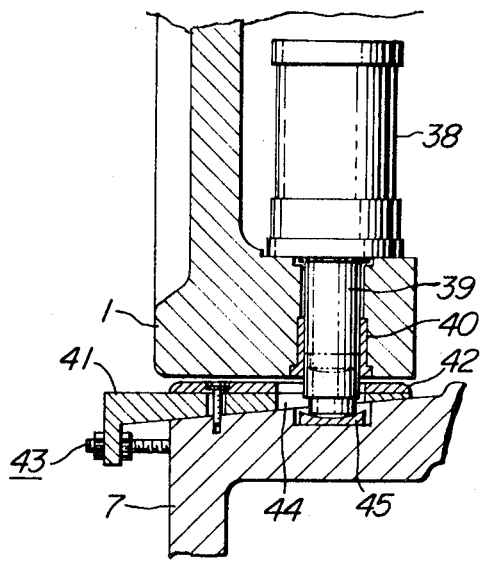
FIG. 6 is an enlarge detailed sectional view of the oil pressure cylinder employed in the shearing machine of the present invention for holding the stationary lower knife holder.

A clamp mechanism for the lower knife holder 7 is shown in FIGS. 2 and 6. The clamp mechanism is constructed taking a side pressure (load in the horizontal direction) effected at the time of cutting the material into consideration so that the clamping operation may always effectively performed. That is, since the lower knife is subjected to the side pressure in the direction to enlarge the clearance $C_0$ between the upper and lower knives at the time of cutting materials, the oil pressure cylinder 38 for clamping is so disposed that the clamping force may effect in the same direction as that of the side pressure. In construction, the oil pressure cylinder 38 for clamping the lower knife holder 7 is mounted in the housing 1, 1' on the side where the adjusting wedge 27 is mounted and urges the lower knife holder 7 onto the side where the adjusting wedge 26 is mounted so the wedge 26 is brought into contact with the side face of the opening 9 in the housing 1, 1'. In the event that the oil pressure cylinder 38 for clamping the lower knife holder 7 is mounted on the opposite side, the force of the oil pressure cylinder 38 should be greater than the above-described side pressure, which results in an increase in cost of the machine. The piston rod 39 of the oil pressure cylinder 38 is guided by a guide bush 40 of the housing and extends through elongated holes 43 and 44 of the wedge member 41 and bracket 42 respectively. The position of the wedge member 41 may be adjusted by the adjustment of adjusting means 43. The lower end of the piston rod 39 is spherically shaped and supported on a mating surface of a wear disk 45 mounted in the lower knife holder 7 so that the pushing force of the cylinder 38 for clamping the lower knife holder 7 is exerted on the lower knife holder 7. The piston rod 39 is retracted up to the position shown by a dotted line when the knife holders are changed.

Figure 4:
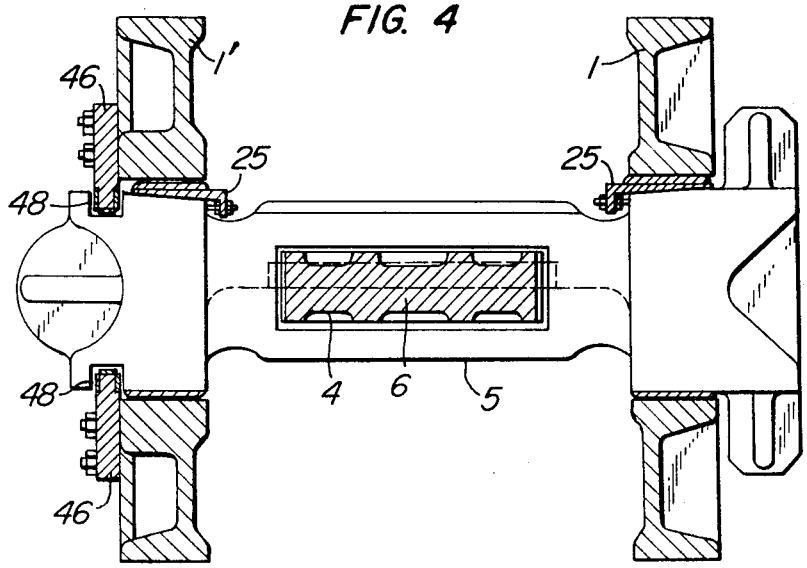
FIG. 4 is a sectional plan view taken along the line IV—IV in FIG. 2.

At the time of cutting materials, the upper and lower knife holders 5 and 7 are subject to a thrust in the longitudinal direction since the thickness is not always equal along the lateral direction of the material. The thrust is borne by the thrust-bearing plates 46 and 47 shown in FIGS. 3 and 4. The thrust-bearing plates 46 and 47 are mounted in the grooves 48 and 49 provided on the upper and lower knife holders 5 and 7 only on the side where the driving mechanism is connected. The thrust-bearing plates 46 and 47 are inserted into the grooves 48 and 49 only when the cutting operation is performed and are removed from the grooves of the knife holders when the knife holders are interchanged. The mounting and removing operation of the thrust-bearing plates 46 and 47 is performed by a sliding movement thereof in the direction indicated by the arrow Q in FIG. 3 which is effected by a cylinder 52. The thrust-bearing plate 47 is provided with an elongated hole 50 so that it is guided by a bolt 51 fixed to the housing 1' along the elongated hole 50. Thus, the thrust-bearing plates 46 and 47 are inserted into and removed from the knife holders by the operation of the hydraulic cylinder 52.

The manner in which the three wedge means are adjusted outside the machine in relation with one another at the time of changing holders will now be explained. The dimensions of the knife holders to be known outside the machine before the knife holders are mounted to the housing are the actual clearance C between the upper and lower knives and the clearance $\delta_1$ between the sliding surface and the upper knife holder 5. After the two dimensions are measured, the wedge means are adjusted to obtain the desired clearances. First, the width $L_1$ of the upper knife holder 5 is adjusted to be $L_1=L_o-\delta_1$ by the adjusting wedge means 25, where $L_o$ is the standard width of the opening 9 of the housing 1 and 1'. Second, the width of the knife-holding portion of the lower knife holder 7 is adjusted to be $L_1=l_o-C_o$ by the adjusting-wedge means 26, where $l_o$ is the width of the upper knife holder and $C_o$ is the desired clearance between the upper and lower knives 6 and 8. Though the actual clearance C between the upper and lower knives is dependent on the above clearance $\delta_1$, the width $l_1$ is adjusted with respect to the desired clearance $C_o$ outside the machine. Third, the width of the lower knife holder as a whole is adjusted to be $L_2=L_o-\delta_2$ by the adjusting wedge means 27, since there should be proper clearance $\delta_2$ between the lower knife holder 7 and the sliding surface of the opening 9 of the housing in order to make it easy to insert the lower knife holder 7 into the opening 9 of the housing.

According to the above-described adjustment by the adjusting-wedge meanS, the necessary clearances $\delta_1$ and $\delta_2$ are provided and the clearance between the upper and lower knives C can be made to be larger than or equal to $C_o-\delta_2$ and less than or equal to $C_o+\delta_1$, , i.e., $C_o-\delta_2 \leq C \leq C_o+\delta_1$.

It should now be noted that $C_o-\delta_2$ should be positive and $C_o+\delta_1$ should not be too large. If the $C_o-\delta_2$ is negative, there is possibility of interference between the upper and lower knives. And if $C_o+\delta_1$ is made too large by making $C_o$ larger than $\delta_2$, the performance of cutting operation of the material is degraded and the life of the knives is shortened. In the shearing machine of the present invention, therefore, the lower knife holder 7 is urged by the oil pressure cylinder for clamping in the direction to enlarge the clearance C between the upper and lower knives. Thus, the clearance between the upper and lower knives is able to be $C_o \leq C \leq C_o+\delta_1$ so that there may not be interference between the upper and lower knives and the cutting operation may be performed in good condition.

As described hereinabove, in the shearing machine in accordance with the present invention, the adjusting wedge means 25, 26 and 27 are cooperated with the oil pressure cylinder 38 for clamping the lower knife holder 7 to adjust the desired clearance C, $\delta_1$ and $\delta_2$ of the preliminary knife holders outside the machine before the holders are inserted into the housing of the machine. This adjustment is performed only by the following three steps:

1. adjusting the width $L_1$ of the upper knife holder to be $L_1=L_o-\delta_1$ by the adjusting wedge means 25;
2. adjusting the width $l_1$ of the knife-holding portion of the lower knife holder to be $l_1=l_o-C_o$ by the adjusting-wedge means 26; and
3. adjusting the width $L_2$ of the lower knife holder to be $L_2=L_o-\delta_2$ by the adjusting-wedge means 27, where $L_o$ is the standard width of the opening of the housing of the machine.

Though the present invention has been described with particular reference to an embodiment of the shearing machine of the vertical electrically operated type, it should be understood that the like results can be accomplished even in the event that the present invention is applied for an oil pressure operated shearing machine, up-cut type shearing machine and the like. Moreover, it will be understood that various modifications and variations can be effected within the scope and spirit of the invention such as substituting a stationary liner for the adjusting wedge means 27.

What we claim is:

1. In a shearing machine of the interchangeable knife holder type in which a movable knife holder and a stationary knife holder are able to be inserted into and removed out of the opening in the housing of the machine, the improvement comprising a first adjustable wedge means mounted in said movable knife holder for making a predetermined clearance between said movable knife holder and the sliding surfaces of the opening of said housing before said movable knife holder is inserted into said opening of the housing, a second adjustable wedge means mounted in said stationary knife holder for making a predetermined clearance between a movable knife and a stationary knife, and hydraulic pressure cylinder means disposed in said housing for fixedly holding said stationary knife holder by urging said stationary knife holder onto one side of said opening of said housing in the direction to enlarge the clearance between the movable and stationary knives.

2. A shearing machine of the interchangeable knife holder type as claimed in claim 1, wherein said stationary knife holder is further provided with a third adjustable wedge means for making a clearance between said stationary knife holder and the sliding surfaces of said opening of said housing.

3. A shearing machine of the interchangeable knife holder type as claimed in claim 1, wherein said first and second adjustable wedge means each comprises a tapered wedge member, means for holding said wedge member from outside so that said wedge member may be slided along the sloped surface of the knife holder, and an adjusting means for adjusting the position of said wedge member.

4. A shearing machine of the interchangeable knife holder type as claimed in claim 2, wherein said third adjustable wedge means comprises a tapered wedge member, means for holding said wedge member from outside so that said wedge member may be slided along the sloped surface of the knife holder between said last-mentioned means and said knife holder, and adjusting means for adjusting the position of said wedge member.

* * * * *